United States Patent [19]

Forch

[11] 4,304,414
[45] Dec. 8, 1981

[54] PRESSURE-BALANCED PACKING

[75] Inventor: Hans Forch, Birkenau, Fed. Rep. of Germany

[73] Assignee: Firma Carl Freudenberg, Hohnerweg, Fed. Rep. of Germany

[21] Appl. No.: 41,224

[22] Filed: May 21, 1979

Related U.S. Application Data

[62] Division of Ser. No. 831,451, Sep. 8, 1977, Pat. No. 4,172,599.

[30] Foreign Application Priority Data

Sep. 25, 1976 [DE] Fed. Rep. of Germany ....... 2643229

[51] Int. Cl.$^3$ .............................................. F16J 15/32
[52] U.S. Cl. .................................... 277/153; 277/166
[58] Field of Search ................................ 277/143–145, 277/151–153, 164–166, 179, 181–184, 186

[56] References Cited

U.S. PATENT DOCUMENTS

| | | | |
|---|---|---|---|
| 2,542,141 | 2/1951 | Horton | 277/184 X |
| 3,561,770 | 2/1971 | Corsi et al. | 277/164 X |
| 3,727,923 | 4/1973 | McEwen | 277/143 X |
| 3,848,881 | 11/1974 | Ginn | 277/235 R X |
| 3,854,732 | 12/1974 | Franz et al. | 277/153 X |
| 4,172,599 | 10/1979 | Forch | 277/182 X |

FOREIGN PATENT DOCUMENTS

| | | | |
|---|---|---|---|
| 813226 | 9/1951 | Fed. Rep. of Germany | 277/153 |
| 854448 | 11/1952 | Fed. Rep. of Germany | 277/84 |
| 972155 | 5/1959 | Fed. Rep. of Germany | 277/152 |
| 1945366 | 3/1971 | Fed. Rep. of Germany | 277/165 |
| 544904 | 5/1942 | United Kingdom | 277/153 |
| 593009 | 10/1947 | United Kingdom | 277/182 |

Primary Examiner—Robert S. Ward, Jr.
Attorney, Agent, or Firm—Sprung, Felfe, Horn, Lynch & Kramer

[57] ABSTRACT

A packing ring comprises a stiffening ring having an angular profile and an angularly profiled sealing element fastened thereon composed of an elastomeric material and having the configuration of a two-armed lever. The sealing element comprises a membrane portion forming one arm, a sealing lip on the other arm and an annular portion fastened by the membrane to the annular portion of the stiffening ring. The radial portion of the stiffening ring and the membrane portion define a cavity therebetween and a fulcrum axis is provided centrally of the two arms to pivot the sealing lip into contact with the surface to be sealed.

5 Claims, 5 Drawing Figures

PRESSURE-BALANCED PACKING

This is a division, of application Ser. No. 831,451, filed Sept. 8, 1977 and now U.S. Pat. No. 4,172,599.

BACKGROUND OF THE INVENTION

The invention relates to a method and a packing having a sealing element made of an elastomeric material for the pressure-balanced sealing off of a liquid or gaseous medium, especially in the clearance between machine parts which are movable relative to one another.

It is known to use shaft packing rings, such as for example those described in German Standard DIN 3760, for the sealing off of liquids. These shaft packing rings consist generally of a stiffening ring of metal which has an angular profile, a sealing element made of an elastomeric material being vulcanized onto the inwardly directed leg of said profile, with the interposition of a membrane. The sealing element has a sealing lip which usually is urged by a superimposed tension spring against the shaft.

The use of packings of this kind generally involves the disadvantage that they assure a satisfactory sealing action up to pressures not exceeding 10 kp/cm$^2$, even when they are of the reinforced type. If the packing must withstand higher pressures, it is necessary either to arrange a plurality of such packings in series, also utilizing a hydraulic counterpressure system in some cases, or to use a different type of packing system such as a friction ring packing. Neither packing, however, will be satisfactory in all cases. Friction ring packings have the disadvantage of an extraordinarily high cost, and when shaft packing rings arrayed hydraulically in series are used, it is often impossible to achieve sufficient reliability of operation.

In the effort to improve the pressure stability of the single packing ring and thus combine the advantage of its ease of manufacture with a higher performance characteristic, difficulties are encountered due to the fact that the pressure resistance of these packing rings is limited by a number of technical circumstances.

One of the most important factors is probably that the applied hydraulic pressure results immediately in an increase of the force with which the sealing lip is urged against the surface of the moving part, which can produce uncontrolled overheating of the elastomeric material forming the sealing lip or in alterations of the angle of attitude of the sealing lip to the said surface.

Another difficulty can result from the fact that it is generally impossible to assume that the pressure of the applied medium is constant. For example, when a flange packing is used in a pump, each individual start-up of the machine will produce a gradual rise of the pressure up to the nominal pressure, and under certain circumstances it is also necessary to pass through critical rotatory speeds at which great shaft vibrations are produced. A statically set force of application of the sealing lip to the moving surface, based on a nominal value, thus precludes the use of such packings in these applications.

SUMMARY OF THE INVENTION

The invention is addressed to the problem of developing a method for the sealing off of media under high pressure, which can be practiced by the use of an easy-to-manufacture packing similar to known shaft packing rings, and which overcomes the difficulties named above.

This problem is solved by the invention by a method in which the pressure acting on the sealing element is divided into a component increasing the contact pressure of the sealing edge and a component reducing the contact pressure of the sealing edge, such that the resultant force urges the sealing edge only so tightly against the moving surface in relation to the applied pressure as is necessary for the assurance of a good seal.

In one special embodiment, provision is made so that the sealing element is used for the production of the opposing forces by being so constructed that its profile corresponds to a two-arm lever which, being fastened flexibly at one end through a membrane to a stiffening ring, has at the opposite end a sealing edge, and between them a fulcrum, the hydraulically active surface of the sealing element being greater between the fulcrum and the sealing edge than the corresponding surface between the fulcrum and the membrane. The method can be practiced to special advantage through the use of a packing ring whose stiffening ring has an angular profile and which has on the radial portion of said profile a sealing element which is joined to it by a membrane at one end of its substantially cylindrical shape, and has at its opposite end a sealing lip or edge, and whose fulcrum is formed by a ring which can be disposed on its inner side and can there be embedded, if desired, in a groove. In another desirable embodiment, the sealing element has an angular profile whose radial portion is fastened through a membrane to the outside diameter of the stiffening ring, while in the vicinity of its inside diameter it has at the end facing away from the medium to be sealed an annularly protruding bead as its fulcrum, which lies against the stiffening ring, and which can be reinforced, if desired, by a fulcrum ring of appropriate profile. In an additional special embodiment, the stiffening ring has in the vicinity of its inside diameter, on the end facing the medium to be sealed, a fulcrum edge which forms the fulcrum for the sealing element, the latter, instead of having an angular profile, being able, if desired, to have a radially ribbed triangular or other desirable profile. The radial portion of the sealing element can, in still another embodiment, be formed substantially by the membrane, the latter being able to be reinforced by a tensively stressable reinforcing insert extending, if desired, into the radial portion of the sealing element. With regard to the reinforcing insert, a textile fabric or a wire fabric is especially suitable, which can be embedded in the sealing element, or cemented or welded onto its surface.

The practice of the packing method of the invention is not restricted to the construction of shaft packing rings, but it can also be applied in the construction of piston packing rings.

BRIEF DESCRIPTION OF THE DRAWINGS

A number of examplary embodiments of packings for the practice of the method of the invention are represented in the appended drawing, and are further explained herewith.

DETAILED DESCRIPTION OF THE INVENTION

The packing method of the invention is based essentially on the fact that the profile of the sealing element is that of a two-armed lever in which the hydraulic surfaces acting on either side of the fulcrum are in such proportion to one another that, depending on the applied pressure, the sealing edge is urged against the relatively movable surface only as tightly as is required for the assurance of a good sealing action.

If this fundamental condition is observed, a great number of variations become possible with regard to the particular embodiment of the packing of the invention.

The appended drawings show a number of important embodiments, but the subject matter of the invention is not restricted to these examples.

Figure 1:
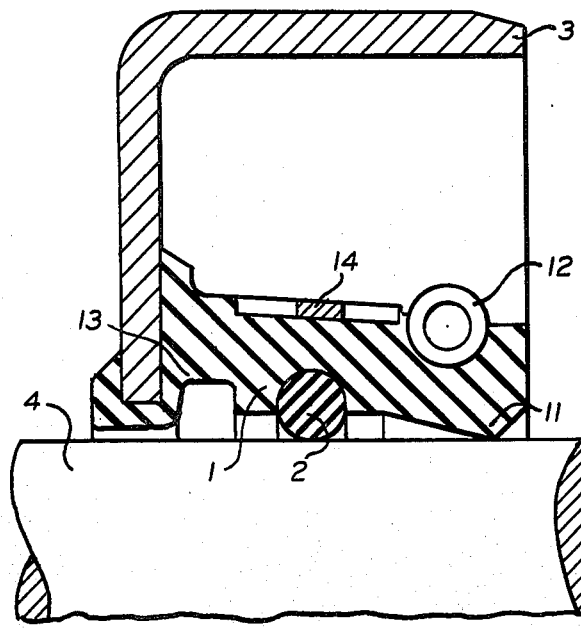
FIG. 1 is a sectional view of the embodiment of the shaft packing ring of the invention.

FIG. 1 shows a pressure balance shaft packing ring with a substantially axially aligned sealing element 1 which is supported on an inlaid ring 2 and on the axial portion of angular stiffening ring 3 around shaft 4. The dynamically acting sealing edge 11 contacts shaft 4 to provide the sealing action. The portion of the sealing element 1 connected to the stiffening ring 3 and a portion in which ring 2 is embedded are connected by membrane 13.

Figure 2:
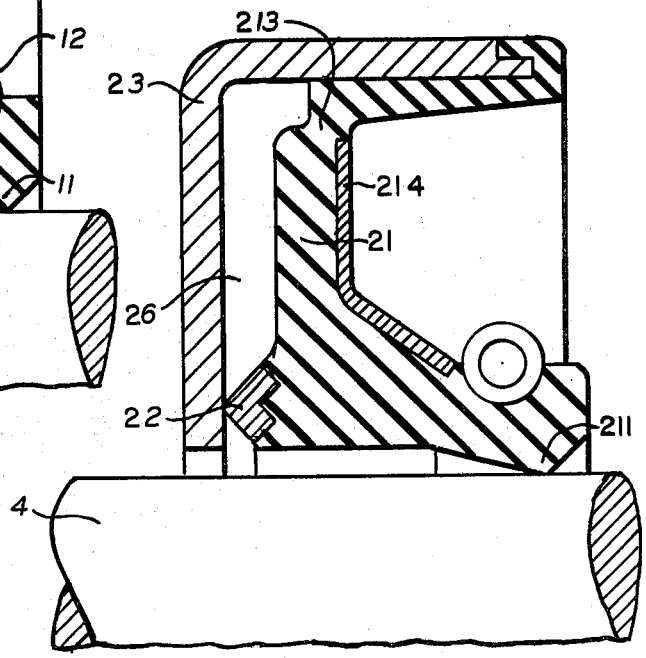
FIG. 2 is a sectional view of a second embodiment of the shaft packing ring.

FIG. 2 shows a corresponding ring having its sealing element 21 having an angular profile. The sealing element 21 is supported by the radial portion of the stiffening ring 23 and by the annular bead 22 which may be embedded in the sealing element. The portion connected to the radial portion of the stiffening ring and the portion connected to the annular bead 22 are connected by membrane 213. The sealing element is fulcrumed about the annular bead 22 with the dynamically acting sealing edge 211 in contact with shaft 4. Cavity 26 is defined inwardly by the annularly protruding bead 22 of the sealing element 1 and stiffening ring 23.

Figure 3:
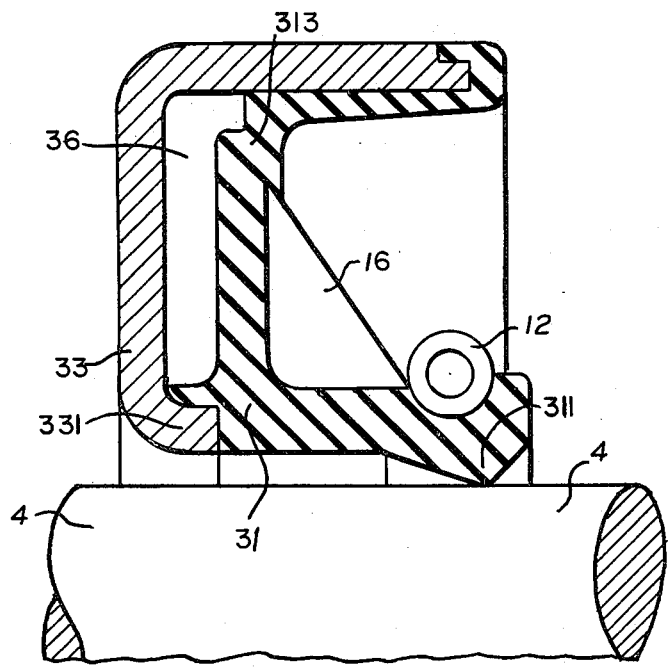
FIG. 3 is a sectional view of a third embodiment of the shaft packing ring.

FIG. 3 shows an alternative construction in which the elastomeric sealing element 31 has a lever-like action. The element is stiffened on the side facing the medium to be sealed in by ribs 16 which are aligned with the axis of rotation and which are uniformly distributed over the circumference. The ribs 16 have a triangular profile. The sealing element 31 is supported on edge 331 of angular stiffening ring 33 and fulcrumed about that edge with dynamically acting sealing edge 311 in contact with shaft 4. The sealing element 31 is also supported on the radial portion of stiffening ring 33 and the fulcrum portion of the sealing element is connected to the radially supported portion of the sealing element by membrane 313 which defines a cavity 36 with the stiffening ring 33.

Figure 4:
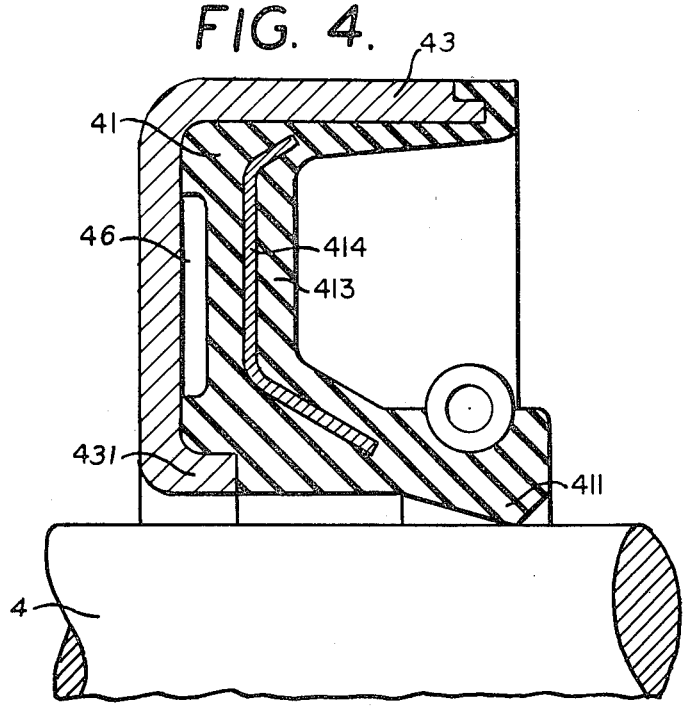
FIG. 4 is a sectional view of a fourth embodiment of the shaft packing ring.

FIG. 4 shows a pressure balance packing ring in which the sealing element 41 has a bell-crank like action with its radial portion being formed substantially by the membrane 413 and which has a compressively stressible reinforcing insert 414. The sealing element 41 is supported by the radial portion of the stiffening ring 43 and is fulcrumed about the edge 431 of stiffening ring 43 and dynamically acting sealing edge 411 is in contact with shaft 4. Cavity 46 is defined between stiffening ring 43 and membrane 413.

Figure 5:
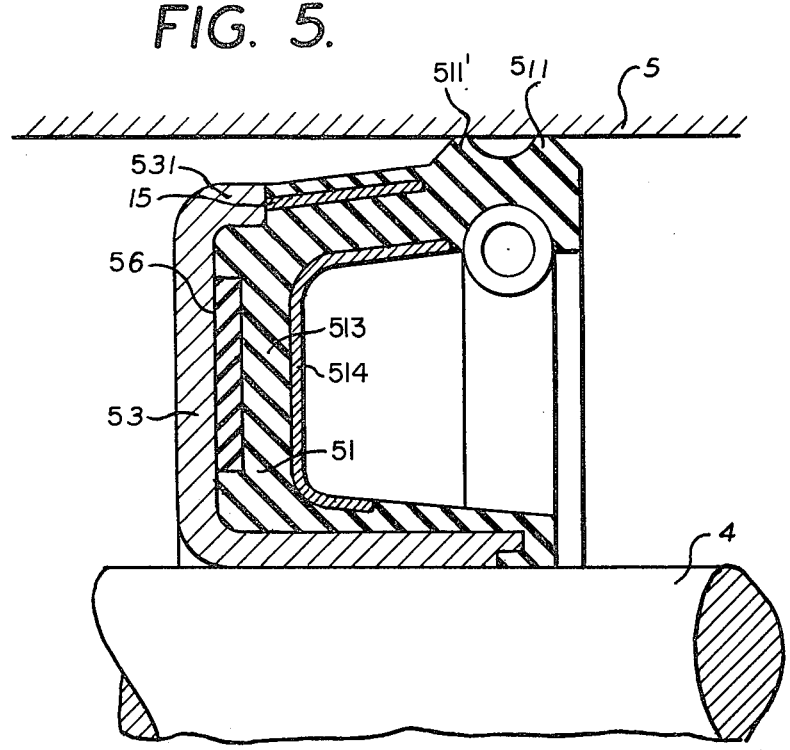
FIG. 5 is a sectional view of the invention as a piston-packing ring.

FIG. 5 corresponds in operation to FIG. 4 but the dynamically acting sealing edges 511, 511' are adapted for application as a piston packing against cylinder 5. In this embodiment, the sealing element 51 is supported by the radial portion of stiffening ring 53 and is fulcrumed about an annularly protruding fulcrum edge 531 of the stiffening ring 53. These two portions of the sealing element 51 are connected by membrane 513 and the cavity 56 defined between the membrane 513 and stiffening ring 53 contains a closed cell resilient plastic foam.

The sealing element in FIG. 1 corresponds in profile to a straight lever of the first kind, the ones in FIGS. 2 and 3 to a bell crank lever, and those in FIGS. 4 and 5 to a lever of the third kind. The stiffening is accomplished in FIGS. 1 and 2 by means of a stiffening insert 14, 214 which is embedded or vulcanized within or over the tension and/or compression zone and in FIGS. 3 and 4 by means of a statically favorable shaping of the sealing element from the elastomeric material. FIG. 5 shows an alternative embodiment in which additional reinforcing elements 15 of a flexible material are embedded in addition to insert 514, cemented or welded in the sealing element in the tensively and compressively stressed zone on the surface of the sealing element which faces the element to be sealed in the form, for example, of steel needles.

The use of reinforcing elements of this or any other kind involves no special difficulty provided that they do not impair the radial movement of the sealing lip, which in the case of annular packings entails a variation of diameter. In designing them, therefore, the most important consideration in each case is to produce a good static stiffening in the radial or axial direction, as the case may be, but none in the circumferential direction. In this respect, radial and/or axial reinforcing elements or measures can always be used to special advantage, whereas flat pieces having isotropic strength characteristics, such as plates or screens, for example, are only suitable if they are arranged in the radial sector. Such a flat screen may in this case also have the function of a plate spring and it can replace the circular coil spring. If fabrics are used, they should have a centrally oriented construction insofar as possible. Often the static and dynamic properties of the sealing element can also be improved by the use of combined reinforcing elements.

There are also various ways of supporting the sealing element on a fulcrum. The sealing element in FIG. 1 is supported in a fulcrum ring 2 disposed on the inner side, which can consist, if desired, also of a material having low friction properties, such as polytetrafluorethylene or bronze. Such an embodiment can have a positive effect on the useful life of the sealing lip especially when such a fulcrum ring is used simultaneously for the radial guidance of the sealing element by the revolving shaft, and when it is frequently necessary to pass through critical rotatory speeds involving heavy radial vibrations.

The fulcruming of the sealing element in FIG. 2 is accomplished by a ring 22 vulcanized or embedded in place, which has a slitted V-shaped cross section to assure a uniform freedom of action of the radial portion of the sealing element. It is also possible to use in its stead a block-wound helical tension spring which, if desired, can be laid on loosely or cemented in place. Such an embodiment is characterized especially by an outstanding radial freedom of movement of the sealing lip. The fulcruming of the sealing element in FIGS. 3 to 5 is accomplished by an annularly protruding fulcrum edge 331, 431, 531 of the stiffening ring 33, 43, 53 respectively which is drawn forward on the pressure side.

Since it is often desired under practical conditions of application to assure a certain minimum force urging the sealing lip against the moving surface, secondary biasing means are often used in the sealing element of the invention, such as, for example, the circular coil springs 12. FIG. 5 shows another such means in the form of an elastic, closed-cell plastic foam disposed in the cavity 56 between the radial portion of the sealing element and the stiffening ring.

It is also possible, of course, to achieve the same object by biasing this chamber by the introduction of a gas or liquid under pressure, thereby providing for a precise control of the sealing lip pressure by varying the gas or liquid pressure.

The special advantage of the method of the invention for the pressure-balanced sealing of liquid or gaseous media consists in the fact that it assures in a simple and reliable manner the sealing of high pressures in the area of the clearance between machine parts moving in relation to one another. The packings used are extraordinarily resistant to wear, and this feature is especially desirable where the shaft is frequently subject to severe radial vibration. When used in the lower-pressure range, a substantially longer useful life can be achieved.

It will be appreciated that the instant specification and examples are set forth by way of illustration and not limitation, and that various modifications and changes may be made without departing from the spirit and scope of the present invention.

What is claimed is:

1. Packing ring comprising:
a stiffening ring having an angular profile, an angularly profiled sealing element fastened thereon and composed of an elastomeric material and having the configuration of a two-armed lever and comprising a sealing lip on one arm, a membrane portion forming the other arm and an annular portion fastened via the membrane portion to the annular portion of the stiffening ring wherein the radial portion of the sealing element is formed substantially by the membrane and the radial portions of the stiffening ring and the sealing ring define a cavity therebetween, means providing a fulcrum axis centrally of the two arms to pivot the sealing lip into contact with the surface to be sealed and a reinforcing insert embedded in the tensively stressed portions of the sealing element and configured to flex under forces applied normal to the radial portion of the sealing element to oppose forces parallel thereto.

2. Packing ring of claim 1, wherein the cavity is pressure-relieved.

3. Packing ring of claim 1, wherein the fulcrum means comprises an annularly protruding fulcrum edge of the stiffening ring defining one boundary of the cavity.

4. Packing ring of claim 1, wherein the cavity contains a closed-cell, resilient plastic foam thereon.

5. Packing ring of claim 1, wherein the reinforcing insert is cemented or welded onto the surface of the sealing element which faces the medium to be sealed in.

* * * * *